United States Patent [19]

Rayfield

[11] 4,158,383

[45] Jun. 19, 1979

[54] APPARATUS FOR COUPLING THE COMPONENTS OF A HEAT PUMP SYSTEM

[76] Inventor: John F. Rayfield, P.O. Box 597, Hollister, Mo. 65672

[21] Appl. No.: 800,335

[22] Filed: May 25, 1977

[51] Int. Cl.² .......................................... H01H 41/00
[52] U.S. Cl. ........................................ 165/11; 62/126; 62/160; 165/29; 324/73 R; 361/166
[58] Field of Search ................ 165/29, 11; 62/160, 62/126, 324; 236/94; 361/166; 324/73 R

[56] References Cited

U.S. PATENT DOCUMENTS

| | | | |
|---|---|---|---|
| 2,969,959 | 1/1961 | Kuhn et al. | 165/29 |
| 3,167,114 | 1/1965 | Swart | 165/29 |
| 3,318,372 | 5/1967 | Shell | 165/29 |
| 3,537,509 | 11/1970 | Ferdelman | 165/29 |
| 3,871,443 | 3/1975 | Jones | 165/11 |
| 3,993,121 | 11/1976 | Medlin et al. | 165/29 |
| 4,002,972 | 1/1977 | Konrad et al. | 324/73 R |
| 4,081,022 | 3/1978 | Wester | 165/11 |
| 4,087,046 | 5/1978 | Borucki et al. | 236/11 |

Primary Examiner—Albert W. Davis, Jr.
Assistant Examiner—M. A. Focarino
Attorney, Agent, or Firm—Lowe, Kokjer, Kircher, Wharton & Bowman

[57] ABSTRACT

This invention discloses an apparatus for coupling and controlling the overall operation of the operable components of a heat pump system. All of the components of the system are coupled through a single master switching relay which provides a central location from which all of the operations of the system can be initiated and tested. Time delay relays are provided to stagger the start of the secondary heating units of the system to avoid an electrical power surge.

9 Claims, 1 Drawing Figure

APPARATUS FOR COUPLING THE COMPONENTS OF A HEAT PUMP SYSTEM

BACKGROUND AND BRIEF DESCRIPTION OF THE INVENTION

This invention relates in general to an apparatus for coupling and controlling the overall operation of the various components of a heat pump system. In particular, this invention relates to an improved low voltage heat pump control panel having a single master switching relay through which all of the heating and cooling components of a heat pump system can be coupled, controlled and tested.

A typical heat pump heating and cooling system includes an indoor thermostat which monitors the temperature of the environment which is being controlled, an outdoor unit which is comprised of a heat pump operable to heat and cool the environment being controlled, and an indoor unit which is comprised of secondary heaters operable to supplement the heating capacity of the outdoor heat pump.

The heating efficiency of a heat pump is directly related to the outdoor temperature. In other words, the heating capacity of a heat pump decreases as the outdoor temperature drops. Since the heating capacity of a heat pump is temperature dependent and since the heating load in most areas is greater than the normal cooling load, the indoor unit is normally equipped with secondary heaters to supplement the heating capacity of the outdoor heat pump. In many cases, the outdoor unit is equipped with one or more thermostats which are operable to monitor the outdoor temperature and to inhibit the heating operation of the indoor unit if the heating capacity of the heat pump at the particular outdoor temperature is sufficient to meet the heating demand.

The proper interaction of the above-described components is essential to the efficient operation of the overall system. Additionally, the heating and cooling components of the heat pump system must be properly connected so that the outdoor unit can be effectively removed from the system if problems with the outdoor heat pump develop. Finally, it is desirable to interconnect all of the heating and cooling components of the system in a central apparatus which is of a standard design and can be used in a number of heat pump systems.

My invention provides a low voltage heat pump control panel that is of a standard design and suitable for use in a number of different heat pump systems. The low voltage control panel of the present invention utilizes a single master switching relay which controls the overall operation of the heat pump system and provides a central location from which all of the heating and cooling functions of the system can be tested. Furthermore, the master switching relay is removable and may be replaced by a suitable plug from a remote control testing unit which is operable to remotely initiate all of the heating and cooling functions of the system. The heating and cooling functions which can be initiated in this manner include the heating operation of the heat pump, the cooling operation of the heat pump, the operation of the indoor fan, the operation of each secondary heater, and any combination of the above-mentioned operations. The remote control unit is provided with a number of switches which correspond to the various heating and cooling operations of the system. Closure of a particular switch connects the relay input to which this switch is connected and initiates the corresponding heating or cooling operation controlled by this switch.

My invention also includes an emergency heat switch which controls the switching state of the master switching relay. Closure of the emergency heat switch causes the master switching relay to switch states, thereby placing the system in the emergency heat mode. In the emergency heat mode, the outgoing unit is effectively removed from the system and all of the heating of the system is provided by the secondary heaters of the indoor unit. Finally, the low voltage control panel of the present invention is equipped with time delay relays which are operable to stagger the start of the secondary heating units to eliminate the possibility of an electrical power surge.

It is therefore an object of the present invention to provide an apparatus for effectively interconnecting the low voltage control sections of the heating and cooling components of a heat pump system.

Another object of the present invention is to provide an apparatus for effectively interconnecting the low voltage control sections of the heating and cooling components of a heat pump system that is of a standard design and can be used in a number of different heat pump systems.

It is an aim of the present invention to provide an apparatus for effectively interconnecting the low voltage control sections of the heating and cooling components of a heat pump system that can control the overall operation of the system.

Also an objective of the present invention is to provide an apparatus for effectively interconnecting the low voltage control circuit of the heating and cooling components of a heat pump system whereby all of the heating and cooling operations of the system can be tested from a central location.

A further object of the present invention is to provide an apparatus for effectively interconnecting the low voltage control circuit of the heating and cooling components of a heat pump system wherein servicing and testing of the heat pump system can be greatly facilitated by providing a central location from which all of the operating functions of the system can be remotely initiated.

Still another one of the objects of the present invention is to provide an apparatus for effectively interconnecting the low voltage control circuits of the heating and cooling components of a heat pump system that uses a single master switching relay having two switching states and being operable to control the overall operation of the system.

Another aim of the present invention is to provide an apparatus for effectively interconnecting the low voltage control circuits of the heating and cooling components of a heat pump system that includes a single master switching relay which may be removed from the system and replaced by a plug from a remote control testing unit.

A further object of the present invention is to provide an apparatus for effectively interconnecting the low voltage control circuit of the heating and cooling components of a heat pump system wherein the heating and cooling functions of the system can be remotely initiated by a remote control testing unit.

It is also an object of the present invention to provide an apparatus for effectively interconnecting the low voltage control circuits of the heating and cooling components of a heat pump system that includes an emergency heat switch which is operable to control the switching states of the master switching relay.

An important objective of the present invention is to provide an apparatus for effectively interconnecting the low voltage control circuits of the heating and cooling components of a heat pump system that includes time delay relays which are operable to delay the start of the secondary heaters of the indoor unit.

Other and further objects of the invention, together with the features of novelty appurtenant thereto, will appear in the course of the following description of the drawings.

DETAILED DESCRIPTION OF THE INVENTION

Figure 1:
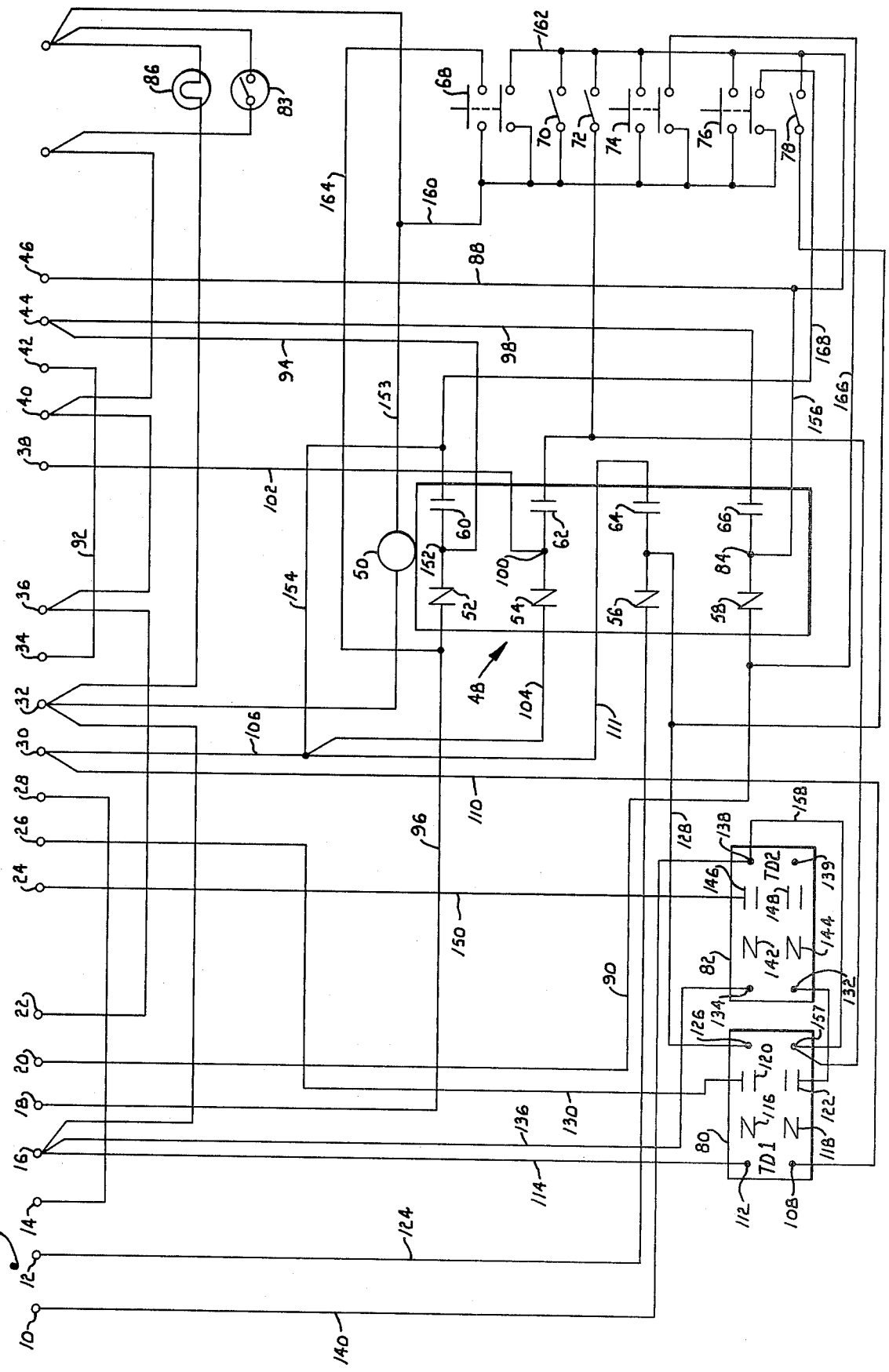

In the accompanying drawing, which forms a part of the specification and is to be read in conjunction therewith, and in which like reference numerals are employed to indicate like parts in the various views the single FIGURE is a detailed schematic drawing of the low voltage control panel of the present invention.

A typical heat pump system is comprised of an indoor thermostat, an indoor unit, and an outdoor unit. The indoor thermostat serves to monitor the temperature of the environment being controlled and to initiate the heating and cooling functions of the system if the temperature within the controlled environment increases above a preselected temperature during cooling or decreases below a preselected temperature during heating. The indoor unit is usually comprised of a fan for circulating the air within the controlled environment and secondary resistance heaters to supplement the heating capacity of the heat pump. The outdoor unit, on the other hand, is made up of the heat pump and may include two thermostats which are operable to monitor the outdoor temperature and to activate the secondary heaters if the outdoor temperature drops below a preset level. Each of these components must be interconnected to form an integrated system which is operable to maintain the temperature of the controlled environment within a preselected range.

Referring now to the drawing, this FIGURE is a schematic illustration of the low voltage control panel of the present invention which operably couples the respective components of the heat pump system to form an integrated heating and cooling system. The low voltage control panel shown in this FIGURE is designed to be installed near the indoor unit or at any other suitable location which is easily accessible.

The low voltage control panel of the present invention is provided with a single terminal block mde up of terminal contacts to which the respective units of the heat pump system can be operably coupled. Terminals 10, 12, 14, 16, 18, 20 and 22 provide a means for electrically coupling the low voltage control section of the outdoor unit to the control panel of the present invention. The low voltage control section of the indoor unit is electrically connected to the control panel of the present invention by means of terminals 24, 26, 28, 30, 32, 34 and 36. The indoor thermostat is electrically coupled to the control panel of the present invention by means of terminals 38, 40, 42, 44 and 46.

The master switching relay is generally designated by the numeral 48. This relay is a plug-in type of relay having eight switching contacts which change state when a switching signal is provided to relay coil 50. As shown in the drawing, master relay 48 is in its normal operating condition wherein contacts 52, 54, 56 and 58 are in a normally closed position while contacts 60, 62, 64 and 66 are in a normally open position. Master relay 48 provides a means through which the respective components of the heat pump system can be electrically coupled and controlled.

Master switching relay 48 also provides a central location from which all of the operating functions of the heat pump system can be individually initiated and tested. These functions include the heating operation of the heat pump, the cooling operation of the heat pump, the operation of the indoor fan, the operation of each secondary heater, and any combination of the above operations. Before the above-described test functions can be initiated, master switching relay 48 must be unplugged and removed from the control panel. As viewed in the FIGURE, removal of master switching relay 48 will in effect open all of the contacts of this relay and produce an open circuit at relay coil 50. Each of the functions of the heat pump system can then be initiated by closing the appropriate test switch 68, 70, 72, 74, 76 and 78.

Test switches 68, 74 and 76 are double pole single throw switches which respectively initiate the heating operation of the heat pump in combination with the operation of the indoor fan, the cooling operation of the heat pump in combination with the indoor fan, and the heating operation of all of the stages of the secondary heaters if the outdoor thermostats are closed or the heating operation of the first stage of the secondary heaters if the outdoor thermostats are open. If the outdoor thermostats are open, the second and third stages of the secondary heaters can be energized by closing single pole single throw switches 78 and 72 respectively. The operation of the indoor fan can be individually initiated by closure of single pole single throw switch 70.

It should be pointed out at this time that testing switches are only shown in the drawing for the purpose of illustration and not by way of limitation. These switches need not be included on the control panel of the present invention itself. In fact, it is desirable to mount these switches on a control box so that one of the test switches cannot be accidently closed during normal operation. The control box will be equipped with six test switches corresponding to those shown in the drawing and with a plug identical to that of the switching relay. In this embodiment of the present invention testing of the heat pump functions is initiated by removing the master switching relay and replacing it with the plug of the remote control unit. Thereafter, the desired heat pump function can be activated by closure of the particular test switch operable to initiate that function. Closure of a test switch connects the appropriate terminals on the control box plug to activate the desired function. In this way, all of the heat pump functions that can be activated by the test switches shown in the drawing can also be activated by the test switches on the associated control box when it is plugged into the control panel.

Time delay relays 80 and 82 are provided to stagger the start of the second and third stages of the secondary heater. These delay relays include timing inputs 108, 112, 132 and 134; normally closed contacts 116, 118, 142 and 144; normally open contacts 120, 122, 142 and 144 and common terminals 126, 157, 138 and 139. The emergency heat relay 50 is activated by emergency heat switch 83. If a problem develops in the outdoor unit, then emergency switch 83 can be closed thereby changing the switching state of master relay 48 resulting in the removal of the outdoor unit from the system.

In operation, a 24 volt power signal is present at output terminal 40. When the indoor thermostat is properly wired to the low voltage control panel of the present invention, the 24 volt power signal present at output terminal 40 is supplied to the thermostat to provide operating power to this unit. Similarly, a 24 volt power signal is also provided to the low voltage control circuits of the outdoor and indoor units by means of output terminals 22 and 36 respectively. The 24 volt power signal is also provided to the emergency heat switch 83 which is open in the normal mode of operation. Contacts 16 and 32 provide a common ground for the control panel.

When the heat pump system is set up to cool the controlled environment, the indoor thermostat provides a cooling signal to contact terminal 46 when the temperature in the controlled environment rises above a preselected level. This signal is then sent to terminal 84 of master relay 48 by means of connector line 88. After passing through normally closed contact 58, this signal is provided to output terminal 20 by means of line conductor 90. Output terminal 20 is electrically connected to a corresponding terminal on the output unit and the presence of a cooling signal at this terminal energizes the compressor of the heat pump thereby activating the cooling operation of this unit. A fan activation signal is simultaneously provided to input terminal 42. This signal is sent by means of connector line 92 to output terminal 34 where it energizes the indoor fan relay thus activating the indoor fan.

In the heating mode of operation, the indoor thermostat provides a heating signal to input terminal 44 if the temperature within the controlled environment drops below a preselected level. When the master relay is in its normal operating state as shown in the drawing, the heating signal will be sent to output terminal 18 by means of line conductor 94, normally closed contact 52, and line conductor 96. Output terminal 18 is electrically connected to the low voltage control circuit of the outdoor unit and the presence of a heating signal at this terminal initiates the heating operation of the heat pump. The heating signal is also provided to normally open contact 66 by means of conductor line 98. Since this contact is open in the normal operating state, the heating signal will be terminated at this point.

If the heating capacity of the heat pump is insufficient to keep the temperature of the controlled environment at the preselected level, the indoor thermostat will provide a second heating signal to input terminal 38. This signal is then electrically sent to terminal 100 of the master switching relay by means of connector line 102. If the master switching relay is in its normal operating state, this signal continues through normally closed contact 54 and is provided to output terminal 30 by means of connector lines 104 and 106. The presence of a heating signal at output terminal 30 immediately activates the first stage of the indoor heaters. This heating signal is also provided to start input 108 of time delay relay 80 by means of conductor line 110. Terminal 112 of time delay relay 80 is electrically connected to the common ground terminal 16 by means of conductor line 114. After a preselected time delay, normally closed contacts 116 and 118 will be open and normally closed contacts 120 and 122 will be closed.

The outdoor unit may be provided with two thermostats that are operable to monitor the outdoor temperature. These thermostats are electrically connected to the control panel of the present invention at input terminals 10 and 12. The thermostat connected to input terminal 12 is typically set at a higher temperature than the thermostat at input terminal 10. If the outdoor thermostat connected to input terminal 12 is closed, then a power signal will be provided to input terminal 12 from the outdoor unit. This signal is then sent to the normally closed contact 56 of the master relay by means of conductor line 124. If the master relay is in its normal operating state, then this signal continues through normally closed contact 56 and is provided to the common terminal 126 of the time delay relay 80 by means of line 128. Once time delay relay 80 has timed out and normally open contacts 120 and 122 have been closed, the power signal provided to common terminal 126 will be passed through normally open contact 120 and provided to output terminal 26 by means of line conductor 130. The presence of a power signal at output terminal 26 activates the second stage of the secondary heaters.

Closure of normally open contact 122 also provides an energization signal to the start input 132 of time delay relay 82 which initiates the timing function of this relay. Terminal 134 is electrically connected to the common ground terminal 16 by means of line 136. The outdoor unit may be equipped with a second thermostat which will be connected to input terminal 10. If this thermostat is closed, then a power signal will be provided directly to the common terminal 138 of time delay 82 by means of input terminal 10 and conductor line 140. Once time delay relay 82 has timed out, the relay will be energized causing normally closed contacts 142 and 144 to be open and normally open contacts 146 and 148 to be closed. Closure of normally open contact 146 transmits the power signal inputted at common terminal 138 to output terminal 24 by means of line 150. The presence of a power signal at output terminal 24 activates the third stage of the secondary heaters.

It should be noted at this time that the outdoor unit need not be equipped with two thermostats. If the control panel shown in the FIGURE is being used in conjunction with an outdoor unit that does not include any thermostats, then the thermostat inputs 10 and 12 can be wired directly to power terminal 22. In this way, a power signal will be continuously supplied to time delay relays 80 and 82 so that energization of these relays will provide a heating signal immediately to the second and third stages of the secondary heater. Similarly, the control panel shown in the drawing may be altered to include only one outdoor terminal input and only one time delay relay.

Closure of emergency heat switch 83 provides an energization signal to switching coil 50 via conductor line 153. Energization of relay coil 50 causes master switching relay 48 to switch from its normal operating state to the emergency heat state. In the emergency heat state normally closed contacts 52, 54, 56 and 58 are opened while normally open contacts 60, 62, 64 and 66 are simultaneously closed. This switching state effectively removes the outdoor unit from the system thereby transferring full heating responsibility to the secondary heaters of the indoor unit. An energization signal is also provided to indicator lamp 86 which activates this lamp indicating that the heat pump system is operating in the emergency heat state.

Thereafter, a heating signal provided to input terminal 44 by the indoor thermostat will be sent to master relay terminals 152 and 84 by means of conductor lines 94 and 98 respectively. This signal continues through normally open contact 60 and is then provided by means of conductor lines 154 and 106 to output terminal 30 where it activates the first stage of secondary heaters. The heating signal is also provided to the timing input terminal 108 of delay relay 80 by means of conductor line 110 and to common terminal 126 of delay relay 80 by means of conductor line 111, normally open contact 64 and conductor line 128. The presence of this heating signal at timing terminal 108 initiates the timing function of this relay. The heating signal inputted at terminal 44 also passes through normally open contact 66 and is then sent to terminal 46 via conductor lines 156 and 88. The heating signal provided to terminal 46 is then sent to the indoor thermostat where it initiates the fan activation signal. This signal is then provided to input terminal 42 of the low voltage control panel of the present invention.

If the temperature within the controlled environment continues to drop, the indoor thermostat will provide a second heating signal to input terminal 38. This signal is then sent to terminal 100 of switching relay 48 via conductor line 102. The heating signal then continues through normally open contact 62 and is provided to the common terminal 157 of time delay relay 80. A second conductor line 158 electrically connects common terminal 157 with the common terminal 138 on time delay relay 82. In this way, the second heating signal is provided directly to the time delay relays so that the second and third stages of the secondary heater will be activated as soon as time delay relays 80 and 82 have timed out and closed normally open contacts 120 and 146 respectively. Closure of these contacts provides a heat activation signal to output terminals 26 and 24 via conductor lines 130 and 150 respectively.

In order to test the operating functions of the heat pump system, the indoor thermostat must first be set in the off position, the master switching relay 48 must be unplugged from the system, and emergency heat switch 83 must be put in the emergency heat position. Thereafter, the operating functions can be initiated and tested by closing the appropriate test switch 68, 70, 72, 74, 76 and 78. A power signal is provided to these test switches by means of conductor line 160. Closure of test switch 74 activates the cooling operation of the heat pump and the operation of the indoor fan. The cooling operation of the outdoor heat pump is activated by providing a power signal to output terminal 20 via line conductors 166 and 90. The indoor fan, on the other hand, is activated by providing a power signal to the indoor thermostat at terminal 46. This power signal is provided to terminal 46 by means of conductor lines 162 and 88. Test switch 70 initiates the operation of the indoor fan by providing a power signal to conductor line 162. The heating operation of the outdoor heat pump and in combination with the indoor fan is initiated by closure of test switch 68. Closure of this switch provides a power signal to output terminal 18 by means of conductor lines 164 and 96. A fan activation signal is simultaneously provided to conductor line 162. Closure of test switch 76 activates the first stage of the secondary heaters by providing a power signal to output terminal 30 by means of conductor lines 168, 154 and 106. Closure of this switch also initiates the timing operation of time delay relay 80 by providing a power signal to the timing terminal of this relay via conductor line 110. A fan activation signal is also provided to conductor line 162. The second and third stages of the secondary heater can also be sequenced on by closing test switches 78 and 72 respectively.

From the foregoing, it will be seen that this invention is one well adapted to attain all ends and objects hereinabove set forth, together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A low voltage control panel for use in heat pump systems having an indoor thermostat, an indoor heating unit, and an outdoor heating and cooling unit, said control panel comprising:
   terminal means for operably coupling the control panel with the components of the heat pump system; and
   removable master switching relay means for operably coupling said terminal means, said master switching relay means being capable of being removed from said control panel and replaced by a remote control means having switching means operable to remotely activate all of the heating and cooling functions of the heat pump system individually or in combination.

2. The invention in claim 1 wherein said master switching relay means is comprised of a single switch relay means.

3. The invention in claim 1 including switch means operable to change the switching state of said master relay means.

4. The invention in claim 1, including switching means operable to remotely activate all of the heating and cooling functions of the heat pump system individually or in combination.

5. The invention in claim 1, including time delay means operable to initiate the heating operation of said indoor heating unit in stages.

6. The invention in claim 1 wherein said master relay means has first and second switching states, said first switching state being arranged to operably couple all of the components of the heat pump system and said second switching state being arranged to remove said outdoor unit from the system thereby transferring all of the heating load to said indoor unit.

7. The invention in claim 6 including switching means operable to remotely activate all of the heating and cooling functions of the heat pump system individually or in combination.

8. The invention in claim 6 including time delay means operable to initiate the heating operation of said indoor heating unit in stages.

9. The invention in claim 8 including switching means operable to remotely activate all of the heating and cooling functions of the heat pump system individually or in combination.

* * * * *